United States Patent [19]

Bender

[11] 4,270,334
[45] Jun. 2, 1981

[54] REINFORCING STRUCTURE

[75] Inventor: Fredrick L. Bender, Saginaw, Mich.

[73] Assignee: Bender's Sales & Service, Inc., Saginaw, Mich.

[21] Appl. No.: 64,013

[22] Filed: Aug. 6, 1979

[51] Int. Cl.³ .............................................. E04C 2/34
[52] U.S. Cl. ...................................... 52/828; 52/731; 296/188
[58] Field of Search ................ 52/827, 828, 731, 730; 296/187, 188

[56] References Cited

U.S. PATENT DOCUMENTS

| | | | |
|---|---|---|---|
| 1,762,151 | 6/1930 | Barrows | 52/827 |
| 1,865,284 | 6/1932 | Smith | 52/828 |
| 2,539,817 | 1/1951 | Ditter | 52/731 |
| 3,190,410 | 6/1965 | Mölstad | 52/731 |
| 3,694,790 | 10/1972 | Pamer | 52/731 |
| 3,989,396 | 11/1976 | Matsumoto | 52/731 |
| 4,064,947 | 12/1977 | Cole | 52/731 |
| 4,194,330 | 3/1980 | Smith | 52/828 |

FOREIGN PATENT DOCUMENTS

| | | | |
|---|---|---|---|
| 983232 | 2/1976 | Canada | 52/731 |
| 1010478 | 6/1957 | Fed. Rep. of Germany | 52/731 |

*Primary Examiner*—Price C. Faw, Jr.
*Assistant Examiner*—Henry E. Raduazo
*Attorney, Agent, or Firm*—Learman & McCulloch

[57] ABSTRACT

A reinforcing structure for a member such as a truck bed comprises an elongate, trough-like body having side walls diverging from a base and terminating at their free ends in outwardly turned mounting flanges. Fixed to the base and extending therefrom between the body side walls is an elongate strut the height of which corresponds to that of the side walls. Spanning the distance between the strut and each side wall is a plurality of spaced apart ribs, the upper edges of which are flush with the strut and flanges. The side walls of the body may have a thickness less than that of the strut which, in turn, may have a thickness less than that of the ribs.

7 Claims, 3 Drawing Figures

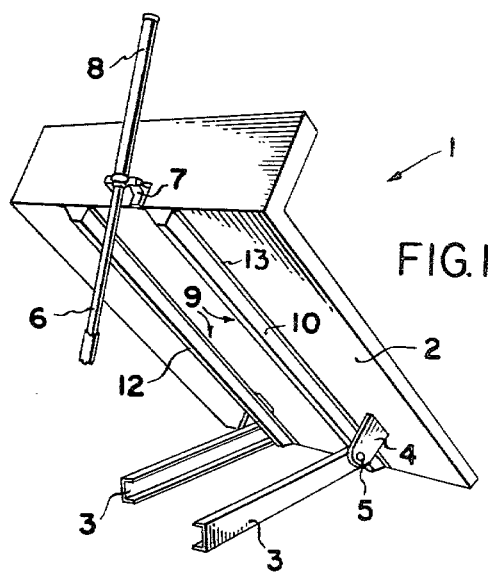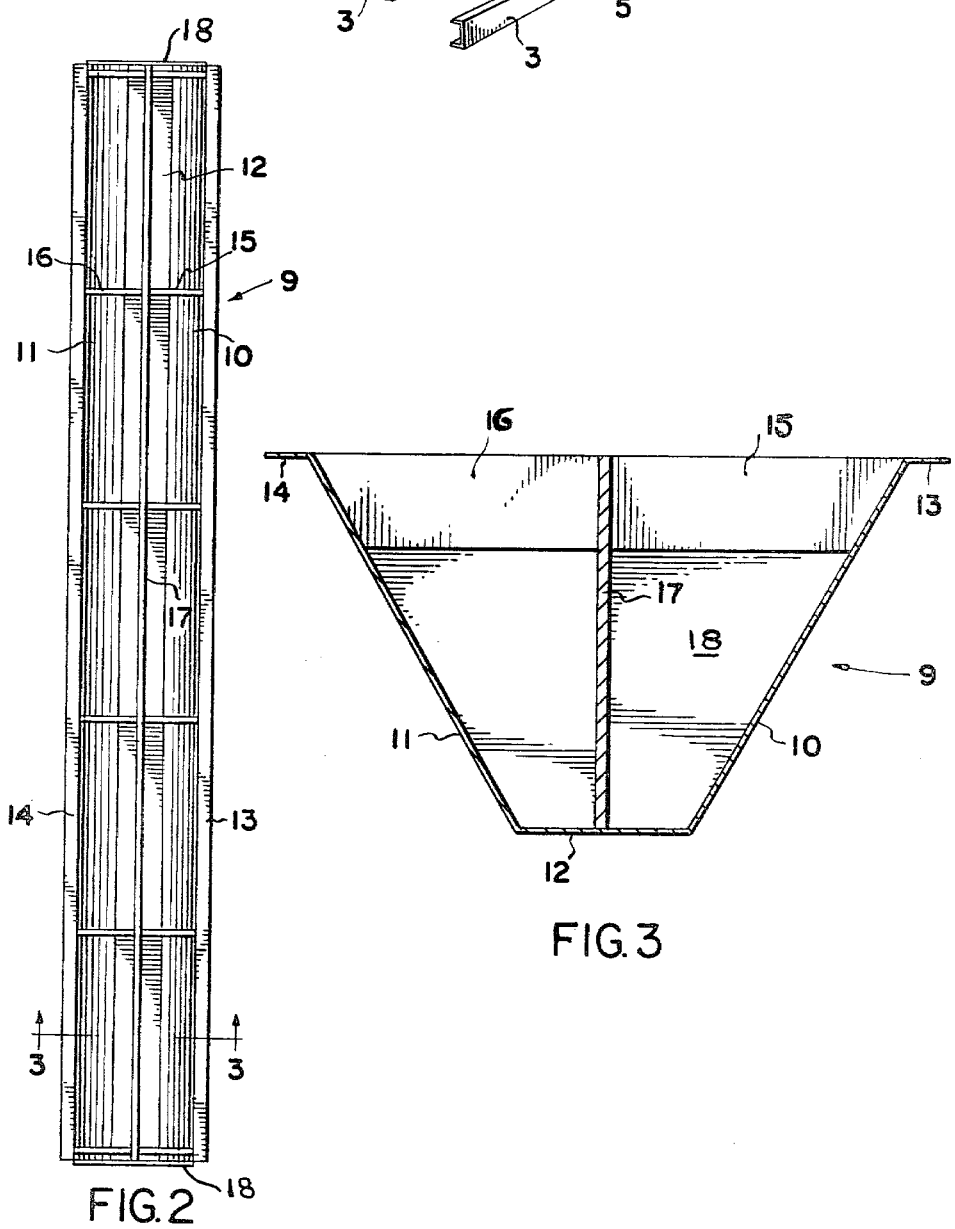

REINFORCING STRUCTURE

BACKGROUND OF THE INVENTION

Vehicles of the kind having a tiltable dump body often require reinforcing of the vehicle bed so as to rigidify the bed against deflection and torsion to which the bed may be subjected during its tilting movements. Trough-like reinforcing structures heretofore have been welded to the lower surface of the vehicle bed, but such structures have less than desirable reinforcing characteristics unless they are constructed from relatively heavy gauge sheet material which is more expensive than lighter gauge material and more difficult to handle due to the greater weight of the material. In some instances the length of the vehicle bed is so great that a fairly large number of such reinforcing troughs must be utilized if any significant reinforcing of the bed is to be achieved, as a consequence of which the weight of the vehicle is increased materially with a consequent reduction in its load carrying capacity and a reduction in its fuel efficiency.

SUMMARY OF THE INVENTION

A principal objective of the present invention is to provide a reinforcing structure for vehicles of the kind referred to and which may be constructed of relatively light gauge material. This objective is achieved by the utilization of a trough-like body having side walls diverging from a base. Fixed to the base and extending between such side walls is an elongate strut. Spanning the distance between the strut and the side walls of the body is a plurality of spaced apart ribs which, together with the strut, rigidify the body both longitudinally and transversely. The utilization of the struts and the ribs makes possible the construction of all parts of the reinforcing structure from relatively small gauge, light weight sheet materials.

DESCRIPTION OF THE DRAWINGS

Reinforcing structure according to the invention is disclosed in the accompanying drawings, wherein:

FIG. 1 is a fragmentary, isometric view of a tiltable vehicle body equipped with a pair of reinforcing structures;

FIG. 2 is a top plan view, on an enlarged scale, of a reinforcing structure formed in accordance with the invention; and FIG. 3 is a sectional view, on a greatly enlarged scale, and taken on the line 3—3 of FIG. 2.

DETAILED DESCRIPTION OF THE INVENTION

A reinforcing structure according to the invention is adapted for use with a vehicle 1 of the kind having a flat bottom bed 2 pivoted at corresponding ends of vehicle chassis members 3 by means of lugs 4 and pivot pins 5. The bed 2 may be raised and lowered about the pivot pins 5 by means of telescoping piston rods 6 pivoted in a conventional manner (not shown) to the vehicle chassis and adapted to be accommodated in a cylinder 8 that is pivotally coupled to the body 2 by means of a fitting 7.

In the embodiment shown in FIG. 1, the lower surface of the bed 2 is provided with a pair of elongate, parallel reinforcing structures 9 which preferably extend the full length of the bed 2.

Each reinforcing structure 9 comprises a trough-like body having a pair of side walls 10 and 11 which diverge from opposite edges of a flat base 12. Outwardly turned flanges 13 and 14 extend from the free ends of the side walls 10 and 11, respectively.

Welded or otherwise fixed to the base 12 is an elongate strut 17 which extends upwardly from the base and occupies a position midway between the side walls 10 and 11. Preferably, the strut 17 extends the full length of the body and has a height corresponding to the height of the side walls so that the surfaces of the flanges 13 and 14 and the strut 17 are coplanar or flush.

At spaced apart intervals along the length of the body is a plurality of ribs 15 and 16. Each rib is welded at one end to the associated side wall and at the opposite end to the strut 17. Preferably, the upper surface of each rib 15 and 16 is flush with the flanges 13 and 14.

In a typical installation, the trough-like body is formed from a single piece of steel or other suitable sheet material having a thickness of about 0.140 in., the material being bent to the configuration shown in FIG. 3 wherein the angle between the base 12 and each of the side walls is substantially 60°. Following bending of the sheet stock the strut 17 is welded to the base 12 so as to occupy a position midway between the side walls. The thickness of the strut preferably is somewhat greater than that of the side walls and may be 0.1875 in. Thereafter, the ribs 15 and 16 may be welded to the respective side walls and to the strut, and each pair of ribs 15 and 16 preferably is coplanar. The thickness of each rib preferably is somewhat greater than that of the strut 17. The thickness of each rib may be 0.250 in.

It is preferred that each end of each reinforcing member 9 be closed by an end wall 18 which may be welded to the side walls and the base and which preferably has a thickness corresponding to that of the side walls. The end walls 18 also preferably are welded to the ends of the strut 17.

The longitudinal spacing between adjacent pairs of ribs 15 and 16, as well as the number of such pairs of ribs, will vary according to the length of the vehicle bed 2 or other member which is to be reinforced. In practice, the spacing between adjacent pairs of ribs may be between 18 and 24 inches.

Following fabrication of the reinforcing structures 9, one or more of them may be secured to the lower surface of the bed 2 by welding the flanges 13 and 14 to the bed. The reinforcing members may be used singly, in pairs, in triplicate, and the like, depending upon such factors as the length and width of the bed, the rigidity of the bed itself, and the loads to which the bed is to be subjected. In any case, the side walls 10 and 11, the ribs 15 and 16, and the strut 17 cooperate to resist beam deflection, outward and inward bowing of the side walls 10 and 11, and torsional forces.

It is not essential that the lower surface of the bed 2 be flat, as is shown in FIG. 1. If the base of the bed is formed with a plurality of transversely extending beams underlying a flat bed, the structures 9 may span the beams and be welded to those beams they engage.

The disclosed embodiment is representative of a presently preferred form of the invention, but is intended to be illustrative rather than definitive thereof. The invention is defined in the claims.

I claim:

1. A reinforcing structure for attachment to one side of a member to be reinforced, said structure comprising an elongate, trough-like, uniform width body independent of said member, said body having a base and side walls diverging outwardly from opposite edges of said base and terminating in co-planar free ends; an elongate strut fixed to said base between said edges of said base and extending outwardly from said base between said side walls, said strut having a free edge flush with the free ends of said side walls; a plurality of ribs fixed to said side walls and to said strut and spaced along the length of said body; and means carried by said body for attaching the latter to said member.

2. A structure according to claim 1, wherein each of said ribs spans the distance between said strut and one of said side walls, and wherein said strut and said ribs are flush with one another and with the free ends of said side walls.

3. A structure according to claim 2 wherein the height of said ribs is less than that of said strut.

4. A structure according to claim 1, wherein said side walls are of uniform thickness, the thickness of said side walls being less than that of said ribs.

5. A structure according to claim 1, wherein said side walls are of uniform thickness, the thickness of said side walls being less than that of said strut.

6. A structure according to claim 1, wherein said strut has a thickness less than that of said ribs.

7. A structure according to claim 1, wherein said attaching means comprises a flange at and flush with the free end of each of said side walls and projecting therefrom in a direction outwardly of said body.

* * * * *